(12) United States Patent
Hengstler

(10) Patent No.: US 11,536,595 B2
(45) Date of Patent: Dec. 27, 2022

(54) DUAL SENSOR

(71) Applicant: VEGA Grieshaber KG, Wolfach (DE)

(72) Inventor: Clemens Hengstler, Haslach (DE)

(73) Assignee: VEGA Grieshaber KG, Wolfach (DE)

( * ) Notice: Subject to any disclaimer, the term of this patent is extended or adjusted under 35 U.S.C. 154(b) by 22 days.

(21) Appl. No.: 17/075,279

(22) Filed: Oct. 20, 2020

(65) Prior Publication Data

US 2021/0116270 A1 Apr. 22, 2021

(30) Foreign Application Priority Data

Oct. 21, 2019 (DE) .................... 10 2019 216 171.5

(51) Int. Cl.
*G01D 15/24* (2006.01)
*G01D 21/02* (2006.01)
(52) U.S. Cl.
CPC ............. *G01D 15/24* (2013.01); *G01D 21/02* (2013.01)
(58) Field of Classification Search
CPC .......... G01D 15/24; G01D 21/02; G01D 3/08; G01D 21/00
See application file for complete search history.

(56) References Cited

U.S. PATENT DOCUMENTS

| 2003/0020421 A1* | 1/2003 | Vu | G01D 3/08 |
| | | | 318/442 |
| 2004/0012264 A1 | 1/2004 | Burger et al. | |
| 2008/0204240 A1* | 8/2008 | Hilgers | G01D 21/00 |
| | | | 340/572.1 |
| 2010/0245057 A1* | 9/2010 | Chamarti | H04Q 9/00 |
| | | | 340/10.42 |
| 2017/0311775 A1* | 11/2017 | Fujita | A61B 1/005 |
| 2018/0331548 A1* | 11/2018 | Hsu | H02J 7/00712 |

FOREIGN PATENT DOCUMENTS

| CN | 110324930 A | * 10/2019 | ......... H05B 33/0809 |
| DE | 10015619 A1 | 10/2001 | |
| DE | 102010042717 A1 | 4/2012 | |

* cited by examiner

*Primary Examiner* — Francis C Gray
(74) *Attorney, Agent, or Firm* — Sterne, Kessler, Goldstein & Fox P.L.L.C.

(57) ABSTRACT

A dual sensor is provided having a first circuit configured for autonomous operation of the sensor and a second circuit configured for non-autonomous operation of the sensor. The dual sensor can be supplied with energy from an external power supply. The first circuit and second circuit can vary in clock frequency, measurement accuracy, and power consumption.

15 Claims, 2 Drawing Sheets

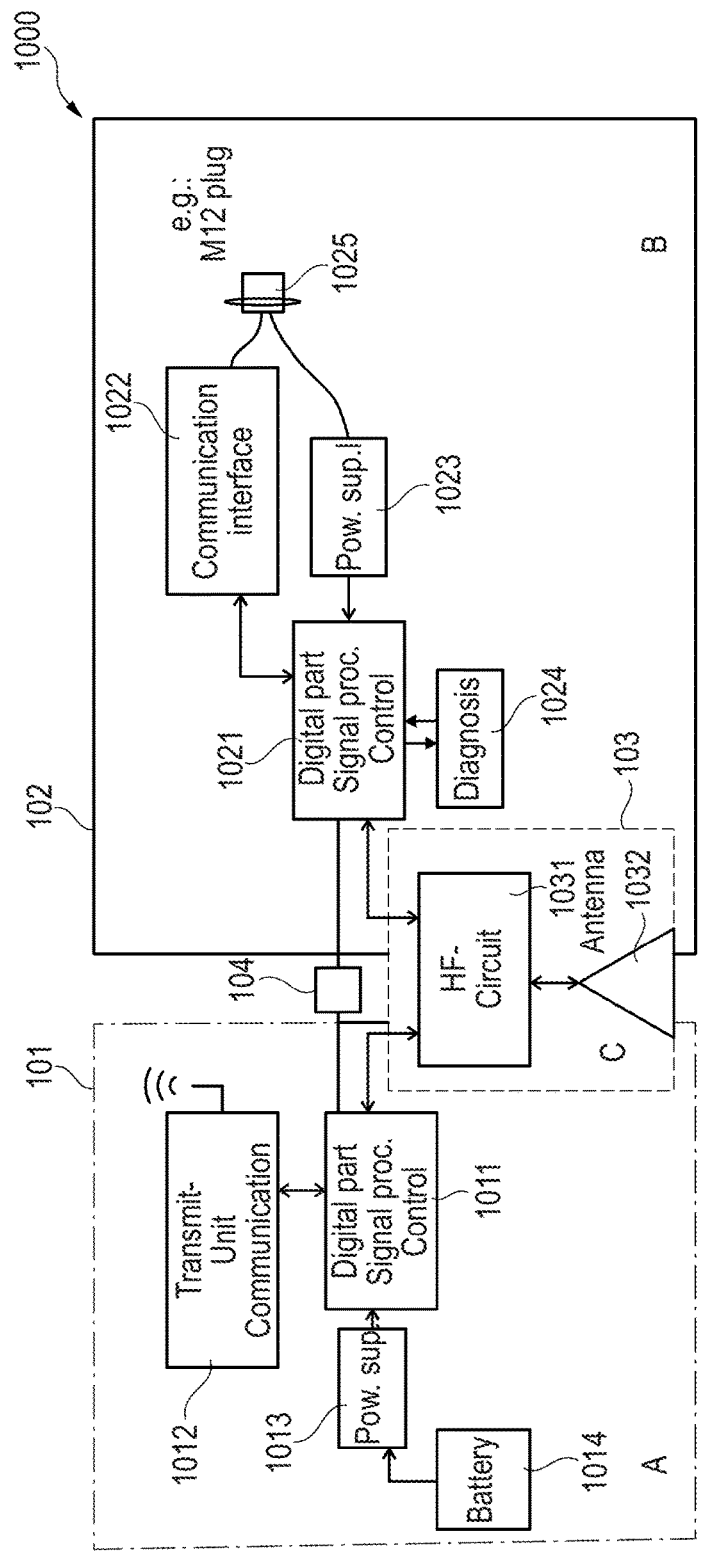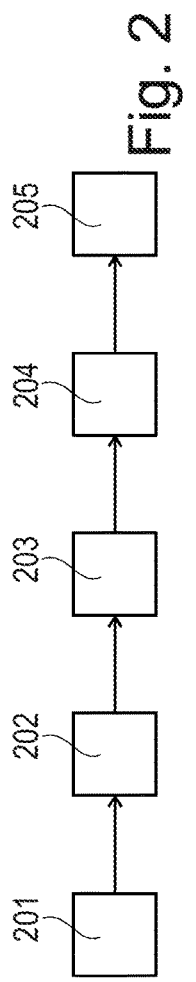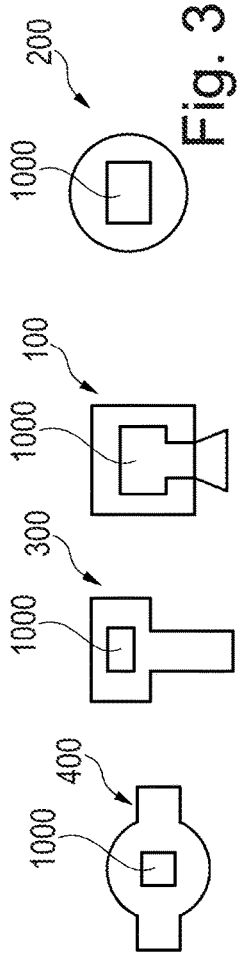

DUAL SENSOR

CROSS-REFERENCE TO RELATED APPLICATIONS

This application claims the benefit of the filing date of German Patent Application No. 10 2019 216 171.5 filed on Oct. 21, 2019 the entire content of which is incorporated herein by reference.

FIELD

The invention relates to measurement technology in an industrial environment. In particular, the invention relates to a dual sensor, several uses of the dual sensor, a method of measuring a process variable with a sensor, a program element and a computer-readable medium.

BACKGROUND

For the acquisition of process variables in industrial environments, sensors are used which can detect a level, a limit level, a flow rate, a pressure or any other measured variable. Many of these sensors are supplied with energy via a cable. For example, they can be set up for connection to a 4 to 20 mA two-wire loop, via which not only the energy supply of the sensors are carried out, but also the communication with a control room or other external devices.

At special locations or for special applications it can be costly to provide a wired power supply for the sensor.

BRIEF SUMMARY

It may be desirable to provide an alternative sensor that can be used flexibly.

An aspect relates to a dual sensor, which comprises a first circuit and a second circuit. The first circuit is configured for an autonomous operation of the dual sensor, in which the dual sensor is not or does not have to be supplied with energy from an external power supply. The second circuit is configured for a non-autonomous operation of the dual sensor, in which the dual sensor is supplied with energy from an external power supply.

The terms first circuit and second circuit should be interpreted broadly. They may be separate circuits, a single circuit or other devices. However, they can also be distributed.

The first circuit and the second circuit may therefore be separate circuits. However, it may also be the case that the two circuits share certain components or assemblies.

These components can, for example, be a high-frequency circuit which generates the actual measurement or transmission signal. In this case, the dual sensor is, for example, a level radar device.

The external power supply can, for example, be a 4 to 20 mA two-wire line, via which the power supply and data exchange with external devices takes place when the dual sensor is in non-autonomous operation. For example, measured values are transmitted via this line.

According to an aspect, the dual sensor has a housing in which both the first and the second circuit are arranged.

According to another aspect, the first circuit has a first processor with a first clock frequency, and the second circuit has a second processor with a second clock frequency. The second clock frequency is higher than the first clock frequency, so that the second processor is more powerful than the first processor.

According to another aspect, the first circuit has a first transmission unit set up to use a first radio protocol. The second circuit may have a second transmitting unit set up to use a second radio protocol. The second radio protocol has a higher power consumption than the first radio protocol. This is because, for example, the dual sensor can provide a higher data transmission rate and/or a greater data transmission range using the second radio protocol than using the first radio protocol. Examples of the first radio protocol include NB-IoT or LoRa (Narrowband IoT or Long Range Wide Area Network).

According to another aspect, the first circuit for the evaluation of a measurement signal is set up with a first measurement accuracy. The second circuit is set up to evaluate a measurement signal with a second measurement accuracy. The second measurement accuracy is higher than the first measurement accuracy.

In other words, the dual sensor is configured to provide more accurate measurement results using the second circuit than the first circuit.

The first circuit can also be set up to perform a first measurement sequence and the second circuit to perform a second measurement sequence, the measurement sequence having a lower power consumption than the second measurement sequence. This lower power consumption can have various causes. For example, when the first measurement sequence is performed, the measurement frequency may be lower than when the second measurement sequence is performed. For example, in the first measurement sequence, it may be planned to take measurements only every 12 hours, whereby the dual sensor is switched to a sleep mode during the measurement pauses in order to save energy. In the second measurement sequence, for example, it may be provided that measurements are taken more frequently and, in particular, that the time required for a complete measurement, i.e., from the generation of the measurement signal, through its transmission, to the evaluation of the received signal, is 500 ms or less, so that the measurement results can be output almost in real time.

The first measurement sequence may also have a lower power consumption because it produces the measurement result with a lower measurement accuracy than the second measurement sequence. It can also be provided that in the second measurement sequence, other data in addition to the actual measured value is calculated and output, for example, diagnostic data of the dual sensor, which may not be provided in the first measurement sequence.

According to another aspect, the first circuit has a battery that is set up to supply power to the dual sensor alone when the dual sensor performs the first measurement sequence. An external power supply is not necessary in this case. In addition, a solar module or similar power supply can also be used to supply power to the dual sensor.

The dual sensor can also have a switch that is set up to switch between the first measurement sequence and the second measurement sequence. This can be a mechanical switch on the housing, accessible to the user, so that when the dual sensor is installed, the user can easily switch from the first measurement sequence to the second measurement sequence, or vice versa. It can also be a software-controlled switch that switches from the first measurement sequence to the second, or vice versa, depending on the application and environmental conditions.

For example, the dual sensor may be designed to detect when the second circuit is connected to an external power supply and then switch automatically from the first measurement sequence to the second measurement sequence.

The dual sensor can also be set up in such a way that it automatically switches over from the second measurement sequence to the first measurement sequence whenever there is not enough energy available or when the external energy supply falls below a certain swivel value in order to save energy.

A further aspect relates to the use of the dual sensor described herein for pressure measurement. A further aspect concerns the use of the dual sensor described herein for level measurement. A further aspect concerns the use of the dual sensor described herein for limit level measurement. Another aspect concerns the use of the dual sensor described herein for flow measurement.

A further aspect relates to a method for measuring a process variable with a sensor, in which a first measuring signal is first acquired and a process variable (a level, a pressure, a limit level, a flow etc.) is calculated from the acquired first measuring signal. For this purpose, a first measuring sequence is used in which the sensor is in a self-sufficient operation and is not supplied with energy from an external power supply. Thereupon a switch-over from the first measuring sequence to a second measuring sequence takes place. Then, a second measuring signal is acquired and the process variable is calculated from the acquired second measuring signal within the second measuring sequence in a non-autonomous operation of the sensor, in which the sensor is supplied with energy from the external energy supply.

Another aspect relates to a program element that, when run on one (or more) processors of a dual sensor, causes the dual sensor to perform the steps described herein.

Another aspect relates to a computer-readable medium on which the program element described above is stored.

In an aspect, the program element may, for example, be loaded and/or stored in a working memory of a data processing device, such as a data processor, whereby the data processing device may also be part of an embodiment of the present invention. This data processing device can be set up to carry out process steps of the method described above. The data processing device may also be set up to automatically execute the computer program or the method and/or to execute inputs from a user. The computer program may also be made available over a data network, such as the internet, and downloaded from such a data network into the memory of the data processing equipment. The computer program may also include an update of an existing computer program, which may enable the existing computer program to perform, for example, the procedure described above.

The computer-readable (memory) medium may be a non-volatile medium suitable for storing and/or distributing a computer program. The computer-readable storage medium may be a CD-ROM, a DVD-ROM, an optical storage medium, a solid state medium, or similar medium, supplied with or as part of other hardware. Additionally or alternatively, the computer readable storage medium may also be distributed or sold in other forms, for example, over a data network such as the internet or other wired or wireless telecommunications systems. For this purpose, the computer-readable storage medium may, for example, take the form of one or more data packets.

In the following, with reference to the figures, embodiments are described. The representations in the figures may be schematic and not to scale.

BRIEF DESCRIPTION OF THE DRAWINGS

In the following, examples of the invention are described in detail with reference to the enclosed figures. Neither the description nor the figures shall be interpreted as restricting the invention. These figures show:

FIG. 1 shows a dual sensor.
FIG. 2 shows a flow chart of a process.
FIG. 3 shows four different measuring devices, each with a dual sensor.

DETAILED DESCRIPTION

Figure 4:
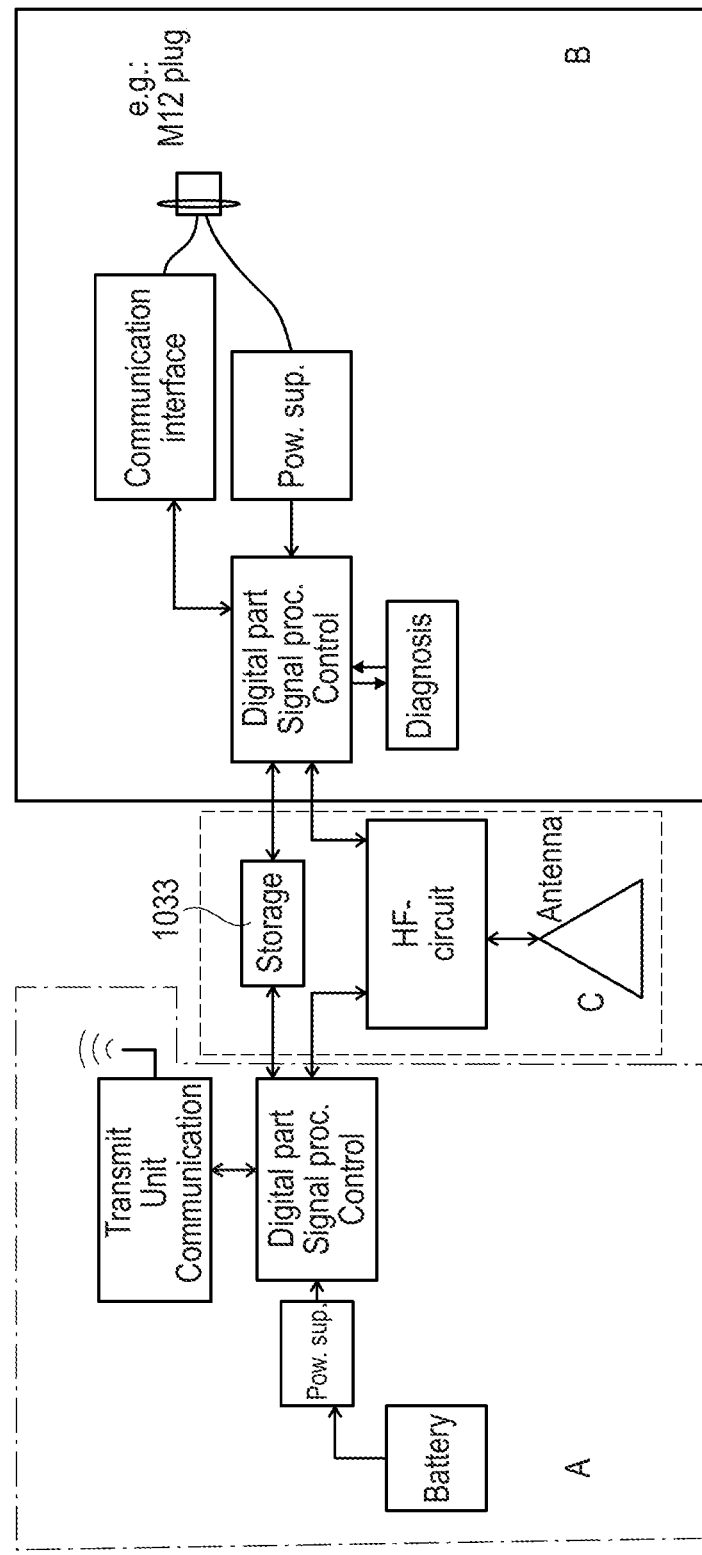
FIG. 4 shows a dual sensor.

FIG. 1 shows a dual sensor 1000. The dual sensor 1000 includes a first circuit 101 and a second circuit 102. The dual sensor 1000 also includes a third circuit 103, which is used by the first circuit 101 and the second circuit 102.

The first circuit 101 is set up for autonomous operation of the dual sensor 1000, in which the dual sensor 1000 is not supplied with energy from an external power supply. The second circuit 102 is set up for a non-autonomous operation of the dual sensor 1000, in which the dual sensor 1000 is supplied with energy from an external power supply.

All three circuits, 101, 102, 103 can be arranged in the same housing.

The first circuit 101 has a first processor 1011 for digital signal processing and control. The first processor 1011 is powered by a battery 1014 or other internal energy storage device and the connected power supply 1013. It controls an HF circuit or measurement signal generation circuit 1031, which generates the measurement signal. In the case of a radar level gauge, this is a high frequency circuit which generates a radar transmit signal. The HF circuit 1031 is connected to an antenna 1032, which radiates the emitted signal towards the product surface and receives the signal reflected from it, to calculate the level.

The first processor 1011 is connected to a first transmitter unit 1012, which is set up to use a first radio protocol to send the calculated measurement results and to receive, for example, control data or parameterization data from an external location.

The second circuit 102 also has a second processor 1021, which is also connected to the measurement signal generation circuit 1031 to control it and to receive measurement signals from it, which can then be evaluated.

A power supply unit 1023 is provided, which is not (exclusively) supplied by a battery, but by an external energy source via interface 1025. The interface 1025 can be a 4 to 20 mA two-wire interface, for example.

Furthermore, a communication interface 1022 is provided, which is also connected to interface 1025 (for its own power supply and for data exchange), as well as to the second processor 1021 (for data exchange).

The dual sensor 1000 is designed to have an extremely energy-saving first circuit (first circuit 101) and a second, largely/partly separated circuit (second circuit 102). The second circuit 102 is designed to meet the requirements for process or automation control. Both circuits are located in a common sensor housing.

The first circuit 101 can be used for self-sufficient logistics or control processes and can meet the following requirements. To control logistics processes, control processes, inventory visualization or inventory management (Supply Chain Management in Industry 4.0), for example, of IBC containers, sensors are required that operate autonomously and transmit the data wirelessly to a superimposed system.

The dual sensor 1000 is powered by a battery or accumulator. It is designed to save energy. A display does not need to be used. The data (e.g., measurement data such as filling level, as well as additional data such as location, temperature, etc. . . . ) are transmitted wirelessly to a superimposed system.

To save energy, the dual sensor 1000 is deactivated during the time when it is not needed. This is achieved by switching off the processor. The dual sensor 1000 may then be woken up and started again after a defined time by a trigger. At certain intervals, the dual sensor 1000 is briefly activated, measures the required value (e.g., fill level) corresponding to the trigger, stores and/or transmits the value to the superimposed system, and then deactivates itself again.

The typical time interval between two consecutive measurements may be, for example, 12 hours or 24 hours.

Since it is often only a matter of planning or controlling the material flow or logistics, a relatively low measuring accuracy is required for the dual sensor 1000. In a container, for example, a measuring accuracy/resolution in the range of 10% or 20% is sufficient. For a typical IBC container, this corresponds to a measurement accuracy of a radar sensor of 10 cm to 20 cm.

The measurement task itself (e.g., the evaluation of an echo curve with a radar sensor) is usually relatively simple during this time when the vessel is used for logistics (storage tank), because the level in the vessel does not change and there are no installations or other interferences in the vessel. For this reason, the measured value evaluation can be structured much more simply than, for example, in a process vessel.

The first circuit 101 is thus optimized for energy saving in order to achieve the longest possible battery life (system runtime).

The dual sensor 1000 can save energy through the following measures, among others:
  A first processor 1011 with a relatively low clock frequency can be used.
  An energy-saving transmission standard (radio protocol) can be used for the transmission of measured values.
  For radar sensors, the echo curve can be calculated with a low resolution (sampling) and the FMCW transmission signal can be generated with a low bandwidth.
  It may be provided that the first processor 1011 only calculates what is absolutely necessary, for example, only the measured value.
  Components and parts that are very energy efficient can be used.
  The cycle time (from measurement to the generated measurement value) can be relatively long, as the measurement result does not have to be provided in real time.
  The simplest algorithms can be used to determine the measured values (e.g., echo evaluation), since at this stage there are few challenges for the evaluation.

The second circuit 102, which fulfils other requirements, may be somewhat different. This second circuit 102 can be used for process control or automation. To control processes, for example the control of an IBC removal or filling station, sensors are required which can transmit "live" data, for example, the current fill level, to a control system or a controller. This current fill level is used to directly control the plant. For example, the dual sensor 1000 should display the current fill level, because based on this value, filling/emptying is stopped or started, or the speed of an agitator is controlled. The current fill level must be present directly at the output of the dual sensor 1000. The sensors can be supplied with power via an interface (e.g., plug, cable, magnetic/inductive, etc.).

The dual sensor 1000, and in particular the second circuit 102, can be set up to meet the following requirements:
  The measurement is very accurate and reproducible. Typical measurement accuracy of a radar sensor for process control is ±2 mm.
  Since the plant or process is controlled based on the determined level, the measurement must be fast and with the shortest possible cycle time. Typical measuring intervals are 500 ms, for example.
  The dual sensor 1000 can be supplied with power via an interface (e.g., interface 1025).
  A display on the dual sensor 1000 is provided.
  The data transmission can be wireless and/or wired (via the interface).
  The dual sensor 1000 does not have to save energy. The dual sensor 1000 must continuously transmit data, for example the fill level information, for the time it is supplied with energy via the interface, as decisions are made based on this information. The time offset should be as short as possible.
  Additional information about the status of the measured value etc. and the quality of the measured value can also be provided. The dual sensor 1000 therefore provides additional information, not only the fill level.

In summary, the second circuit 102 may be optimized for a very fast determination of measured values with high accuracy. The aspect of energy saving takes a back seat here; the available energy (e.g., when connected to a 4 to 20 mA two-wire loop) is used optimally.

The second circuit 102 may have the following characteristics to meet these requirements:
  For example, a second processor 1021 with a high clock frequency can be provided. The transmitter unit 1022 can be set up to use a radio standard for the fastest possible transmission of measured values or a wired transmission of measured values.
  In the case of radar sensors, the echo curve is scanned with high resolution and/or a high bandwidth is used for the FMCW transmission signal. Since sufficient power is available, the second processor 1021 can also process additional algorithms to calculate additional diagnostic values or further information.
  The components and parts provided in the second circuit 102 are optimized for performance.
  It may be envisaged that the cycle time (from measurement to the generated measured value) is as short as possible so that the measurement result can be provided essentially in real time.
  Relatively sophisticated algorithms can be used to determine measured values (e.g., echo evaluation) in order to achieve sufficient measurement reliability and accuracy.
  Incorrect measurements should be avoided as far as possible or at least be recognized as such.
  In particular, when using the second circuit 102, the dual sensor 1000 can be provided to derive not only the level from the current and previously recorded measured value, but also further diagnostic values and additional measured values.

It is clear from the above description that the requirements for a sensor used for logistics and automation can be very different. The dual sensor 1000 in FIG. 1 covers both requirements. The dual sensor 1000 consists of two different (independent) circuit parts. The first circuit 101 is designed for logistics and is energy-saving. The second circuit 102 is set up for automation, for fast determination of measured values and, if necessary, display of measured values.

The two circuits 101, 102 can share one or more circuit components, for example a circuit section which determines the measured value from the measured data.

For example, the dual sensor 1000 is made up of three different circuits 101, 102, 103. Switch 104 can be used to switch back and forth between the first circuit 101 and the second circuit 102.

The first circuit 101 is optimized for self-sufficient and energy-saving mode. The second circuit 102 is optimized for the mode in which the dual sensor 1000 is connected to a controller. The third circuit 103 is shared by both circuits 101, 102.

The first circuit 101 has a transmitter unit 1012, which is optimized for low energy consumption and uses for example NB-IoT or LoRa. The digital part is equipped with a very energy-saving and therefore also slow first processor 1011. In the digital part, the analogue-digital converter integrated in the processor is used to scan the radar signal/envelope.

The battery 1014 and the power supply 1013 are optimized for energy consumption.

The second circuit 102 has the following special features: The communication (transmission of measured values) runs via a wired interface, e.g., an M12 connector 1025. Communication can also be carried out via a radio standard, such as Bluetooth or WLAN. The digital part is equipped with a fast second processor 1021. A special processor can be used to evaluate the envelope curve or an additional analogue-digital converter with a high number of bits can be used.

The second circuit 102 can also be set up to control an additional diagnostic section in addition to the pure determination of measured values, which can calculate diagnostic data.

The power supply unit 1023 is optimized for the respective interface (e.g., IO-Link, 4-20 mA/HART, . . . ) Additional switching outputs (e.g., transistors) can be integrated in the power supply unit, whose switching point is adjusted via the IO-Linkmaster each time the unit is connected to a plug.

The third circuit 103 may differ depending on the measuring principle used. In a level radar, for example, it features signal conditioning 1031 and antenna 1032. In the case of a pressure measurement, it is the measuring cell and the measured value processor. For a limit level measurement, for example, it is a piezo drive and the tuning fork, or a capacitive probe. For a flow measurement it is, for example, a clamp-on ultrasonic transducer.

The third circuit 103 may also have a memory, for example, for calibration. This makes it easier to store data or parameters used by both circuit parts. Or for diagnosis, the necessary parameters and information can be stored in the same memory.

FIG. 4 shows another dual sensor 1000. In comparison to the dual sensor 1000 in FIG. 1, the third circuit 103 has a memory 1033, which is connected to both the first processor 1011 and the second processor 1021 and is used to store data and parameters used by both circuit parts (processors). For example, this would be the min and max adjustment and/or a disturbance signal storage. So it is possible to generate these parameters when operating circuit part 2 during commissioning and to store them in a way that both circuit parts have access to them.

FIG. 2 shows a flow chart of a process for measuring a process variable with a dual sensor 1000. At step 201, a first measurement signal is acquired and the process variable is calculated, at step 202, from the acquired measurement signal within a first measurement sequence in a self-sufficient, autonomous operation of the dual sensor 1000, in which the dual sensor 1000 is not supplied with energy from an external power supply. At step 203, switching takes place from the first measuring sequence to a second measuring sequence. At Step 204, a second measuring signal is acquired and the process variable is calculated, at step 205, from the acquired second measuring signal within the second measuring sequence in a non-autonomous operation of the dual sensor 1000, in which the dual sensor 1000 is supplied with energy from the external power supply.

FIG. 3 shows four different measuring devices, each of which comprises a dual sensor 1000. The measuring device may be, for example, a level measuring device 100, a pressure measuring device 200, a limit level measuring device 300 or a flow measuring device 400.

In addition, it should be noted that "comprising" and "having" does not exclude other elements or steps and the indefinite articles do not exclude "a" or "an" a multitude. It should also be noted that features or steps described by reference to one of the above embodiments may also be used in combination with other features or steps of other embodiments described above. Reference signs in the claims are not to be considered as restrictions.

What is claimed is:

1. A dual sensor, comprising:
a first circuit configured for autonomous operation of the dual sensor, in which the dual sensor is not supplied with energy from an external power supply; and
a second circuit configured for non-autonomous operation of the dual sensor, in which the dual sensor is supplied with energy from the external power supply,
wherein the first circuit is configured to perform a first measurement sequence,
wherein the second circuit is configured to perform a second measurement sequence, and
wherein the first measurement sequence has a lower power consumption than the second measurement sequence.

2. The dual sensor of claim 1, further comprising a housing in which the first and second circuits are arranged.

3. The dual sensor of claim 1, wherein the first circuit comprises a first processor having a first clock frequency,
wherein the second circuit comprises a second processor having a second clock frequency, and
wherein the second clock frequency is higher than the first clock frequency.

4. The dual sensor of claim 1, wherein the first circuit comprises a first transmitting unit arranged to use a first transmission protocol,
wherein the second circuit comprises a second transmitting unit arranged to use a second transmission protocol, and
wherein the second transmission protocol has a higher energy consumption than the first transmission protocol.

5. The dual sensor of claim 1, wherein the first circuit is configured to evaluate a measurement signal with a first measurement accuracy,
wherein the second circuit is configured to evaluate a measurement signal with a second measurement accuracy, and
wherein the second measurement accuracy is higher than the first measurement accuracy.

6. The dual sensor of claim 1, wherein the first circuit comprises a battery adapted to supply power to the dual sensor when it performs the first measurement sequence.

7. The dual sensor of claim 1, further comprising a switch adapted to switch between the first measurement sequence and the second measurement sequence.

8. The dual sensor of claim 1, wherein the dual sensor is adapted to detect a connection of the second circuit to an external power supply and thereupon switch over from the first measurement sequence to the second measurement sequence.

9. Use of the dual sensor of claim 1 for level measurement.

10. Use of the dual sensor of claim 1 for pressure measurement.

11. Use of the dual sensor of claim 1 for limit level measurement.

12. Use of the dual sensor of claim 1 for flow measurement.

13. A method for measuring a process variable with a sensor, the method comprising:
    acquiring a first measurement signal and calculating the process variable from the acquired first measurement signal within a first measurement sequence in a self-sufficient, autonomous operation of the sensor, in which the sensor is not supplied with energy from an external power supply;
    switching from the first measuring sequence to a second measuring sequence; and
    acquiring second measuring signal and calculating the process variable from the acquired second measuring signal within the second measuring sequence in a non-autonomous operation of the sensor, in which the sensor is supplied with energy from the external power supply.

14. A program element for executing a method performed by a processor of a dual sensor, the method comprising:
    acquiring a first measurement signal and calculating a process variable from the acquired first measurement signal within a first measurement sequence in a self-sufficient, autonomous operation of the sensor, in which the dual sensor is not supplied with energy from an external power supply;
    switching from the first measuring sequence to a second measuring sequence; and
    acquiring a second measuring signal and calculating the process variable from the acquired second measuring signal within the second measuring sequence in a non-autonomous operation of the dual sensor, in which the dual sensor is supplied with energy from the external power supply.

15. A non-transitory computer-readable medium on which the program element of claim 14 is stored.

* * * * *

UNITED STATES PATENT AND TRADEMARK OFFICE
CERTIFICATE OF CORRECTION

| | | |
|---|---|---|
| PATENT NO. | : 11,536,595 B2 | |
| APPLICATION NO. | : 17/075279 | |
| DATED | : December 27, 2022 | |
| INVENTOR(S) | : Hengstler | |

It is certified that error appears in the above-identified patent and that said Letters Patent is hereby corrected as shown below:

In the Claims

In Column 10, Line 1, Claim 13, please insert -- a -- before "second measuring signal".

Signed and Sealed this
Seventh Day of March, 2023

*Katherine Kelly Vidal*

Katherine Kelly Vidal
*Director of the United States Patent and Trademark Office*